United States Patent

[11] 3,593,928

| [72] | Inventor | Morris Friedland |
| | | New York, N.Y. |
| [21] | Appl No | 851,564 |
| [22] | Filed | Aug. 20, 1969 |
| [45] | Patented | July 20, 1971 |
| [73] | Assignee | Millmaster Onyx Corporation |
| | | New York, N.Y. |

[54] SYSTEM FOR PRODUCING PRINTING INKS
4 Claims, 1 Drawing Fig.

[52] U.S. Cl. ................................................... 241/34, 241/65
[51] Int. Cl. ........................................... B02c 17/16, B02c 25/00
[50] Field of Search .......................................... 241/34, 46.02, 65, 101, 101 B, 101 D

[56] References Cited
UNITED STATES PATENTS

| 2,864,537 | 12/1958 | Throop | 241/34 X |
| 3,351,293 | 11/1967 | Meisel | 241/34 X |
| 3,401,891 | 9/1968 | Fleeman | 241/34 |
| 3,421,703 | 1/1969 | Galer | 241/34 X |

*Primary Examiner*—Donald G. Kelly
*Attorney*—Arthur A. Jacobs

ABSTRACT: A system for manufacturing printing inks and the like which includes a weighing bin for the solids material, such as carbon black, this bin being operatively connected to a scale which trips a timer mechanism when the material in the bin reaches a predetermined weight. The timer mechanism actuates a release valve in the bin as well as a conveyor which moves the released solids to a mixing tank. The timer also releases a predetermined amount of liquid materials, such as varnish, oils, and solvents, into the mixing tank. The timer causes agitation of the materials in the mixing tank for a predetermined time, after which the mixture is passed to a holding tank and then to a ball mill or the like where it is finally ground. It is then passed through screens of predetermined mesh to storage and dispensing tank. All these steps take place in a timed, continuous manner.

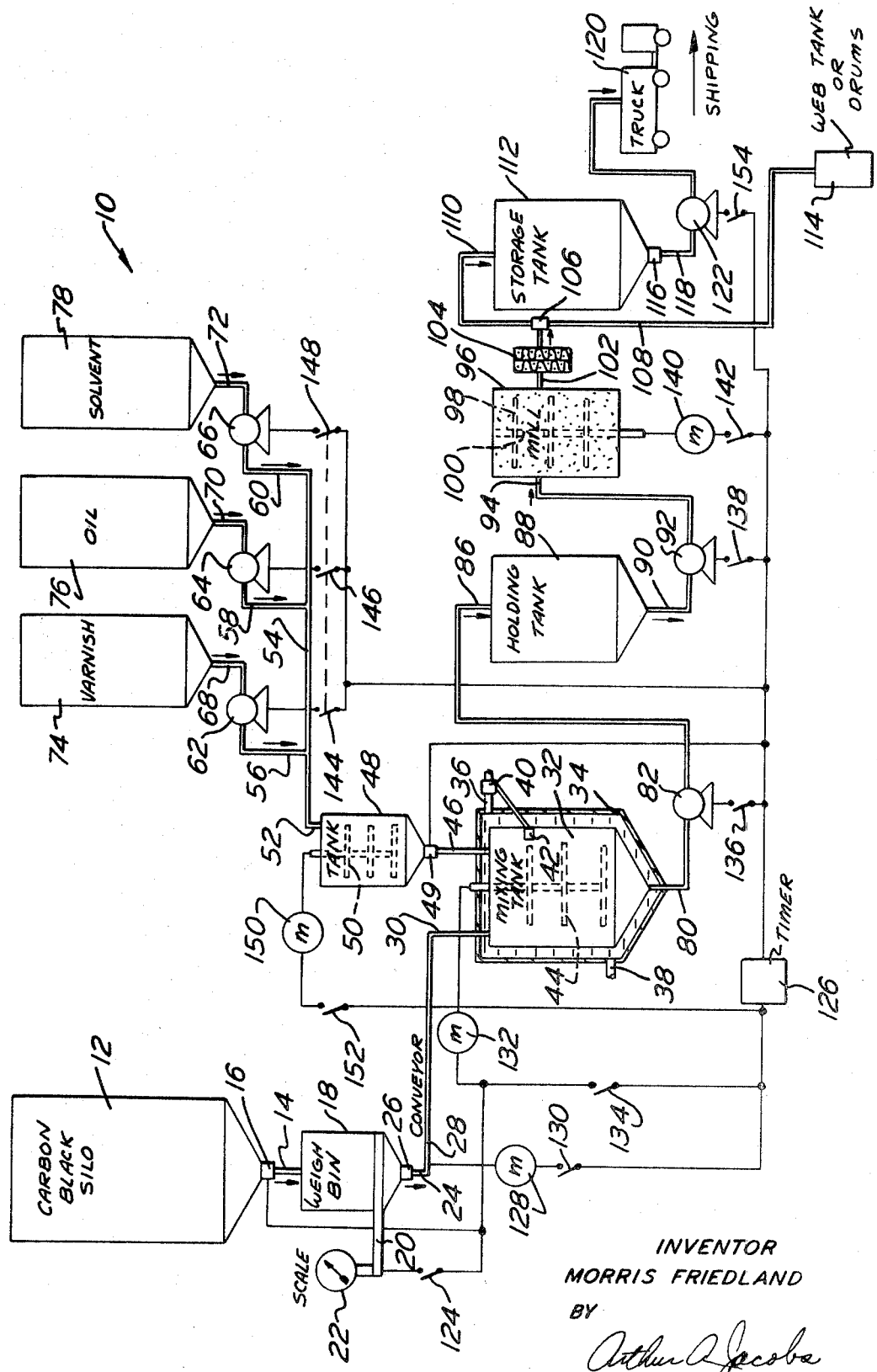

SYSTEM FOR PRODUCING PRINTING INKS

This invention relates to a system for the manufacture of printing inks or the like, and it particularly relates to a system for providing a continuous operation.

Heretofore, the general procedure used in the production of printing inks or the like involved the use of batch methods whereby the components had to be separately weighed or metered, separately mixed under thermally controlled conditions, separately milled and screened, and then separately removed to storage or shipment. These separate operations of the batch system resulted in a great deal of lost time and disproportionally large labor costs due to the amount of labor necessary for both moving the batches from one stage to the other and operating on the batches at each stage. Furthermore, a great amount of space was required for all these operations, each of which necessitated separate handling.

It is one object of the present invention to overcome the aforesaid difficulties by providing a system which is not only continuous but largely automatic, once it is set into operation.

Another object of the present invention is to provide a system of the aforesaid type which occupies a relatively small area and requires a minimum of labor and regulation.

Other objects and many of the attendant advantages of this invention will be readily appreciated as the same becomes better understood by reference to the following description when read in conjunction with the accompanying drawings wherein:

FIG. 1 is a schematic view showing a system embodying the present invention.

In accordance with the present invention, the system comprises at least one, but possibly two or more, water-cooled mixing tanks in which the ratio of the diameter to the height of the tank is in a fixed, predetermined proportion. The tanks are equipped with disc-type mixers whose arm sizes are in fixed proportion relative to the diameter of the tank and whose speed of rotation is proportional to the size of the load.

Raw materials comprising oils, solvents, pigments, resins, and whatever other materials are necessary, are passed from storage tanks or the like into the mixing tanks. Those components which are liquid are metered into the mixing tanks, while those which are solid are weighed on automatic weighing bins from bulk tanks and passed by conveyors into the mixing tanks. The "dry" or solid components should be in the form of crushed, flaked, pelleted, or compacted form in order to be handled without clogging.

A fixed proportion of "liquid" and "solid" ingredients are mixed with the mixing arm of the mixer set at a proportional distance from the bottom of the tank relative to the height of the load in the tank. Mixing is continued until a predetermined temperature is reached, at which time, water is passed through the water jacket of the mixing tank to maintain this predetermined temperature. Mixing is continued until a predetermined homogeneity is obtained.

The mix is then passed into a holding tank for final processing. This final processing consists of passing the material from the holding tank through a ball mill in which the balls are of extremely fine size in order to produce the correct fineness of grind which is determined by the intended viscosity and other characteristics of the desired product. This ball mill includes a stationary housing, and the balls are tumbled through rotation of an inner shaft with radially extending arms.

The milled product is then passed through a series of screens of desired mesh to ensure the removal of any oversize particles or of any undesirable fines resulting from the grinding.

It is of the essence of this invention that the size of the initial mix, the length of the mixing, and the time intervals between the operation at the various stages be coordinated with the speed of the finished ink output at the correct fineness of grind so that the operation may be conducted in a continuous manner.

Referring now in greater detail to the drawing, there is shown a system, generally designated 10, which comprises a silo 12 having an inlet (not shown) and an outlet 14 at its bottom. The outlet 14, which is a gravity-flow outlet, is provided with a solenoid valve 16. The outlet 14 leads into a weighing bin 18 mounted on a bracket 20 extending from a scale 22.

A gravity-fed outlet 24 having a solenoid valve 26, leads from the bottom of the bin 18 to a conveyor 28. The conveyor 28, which may be of any desired type, such as an endless belt, etc. and which is preferably provided with a drive means (not shown) operated in synchronism with the remainder of the system, as hereinafter described, leads to a chute 30 having its lower end extending into the top of a mixing tank 32.

The mixing tank 32 is provided with a coolant jacket 34 having an inlet 36 leading to a source of coolant fluid, such as water or the like (not shown), and an outlet 38 leading to a pump or the like from which it may be led through a heat exchanger (not shown) to be recooled and then recycled to inlet 36. A thermally operated valve 40 is provided for inlet 36, this valve being automatically opened when the temperature of the mix within the tank 32 reaches a predetermined value, as indicated by a thermostat 42, and automatically closes when the temperature falls below a predetermined value. The mixing tank 32 is provided with an agitator 44. This agitator 44 may be, and preferably is, raised and lowered to maintain different levels in the tank during mixing. This may be accomplished manually or may be accomplished automatically through the timer mechanism hereinafter described.

The mixing tank 32 is also provided with an inlet 46 at its upper end, this inlet 46 leading from a premixing tank 48 through a solenoid valve 49. This tank may be provided with a separate agitator 50, as shown, or the agitator 44 may be raised out of the tank 32 and moved into the tank 48 while the mixture is being pumped out of the tank 32, as hereinafter described.

If desired, there may be two or more mixing tanks such as shown at 32. With such arrangement, the agitator 44 may be constructed to swing from one tank to another, whereby when one tank is being charged or the contents thereof are being mixed, the other is being pumped out.

The tank 48 has an inlet 52 at its upper end, which is connected through a line or manifold 54 with the respective outlets 56, 58, and 60 leading from respective pumps 62, 64, and 66, which are, in turn, connected to the respective outlets 68, 70, and 72 of three liquid tanks 74, 76, and 78. These latter tanks individually contain varnish, oil, and a solvent which, combined, form the liquid portion of the ink mixture. It is to be understood, of course, that any number of such liquid tanks may be used as required for the particular product being manufactured.

The bottom of the tank 32 is provided with an outlet 80 connected to a pump 82 which is, in turn, connected through a line 84 to an inlet 86 at the upper end of a holding tank 88. At the lower end of the holding tank 88 is an outlet 90 connected to a pump 92 which is, in turn, connected to an inlet 94 of a ball mill 96. The balls 98 in the mill 96 are preferably of very fine size, like a granular powder or very fine glass beads, in order to produce the desired fineness of grind of the ink. However, these balls may be made of any size desired to fit the requirements of other types of products such as protective coatings, paints, etc. which may also be manufactured in the system embodying the present invention. The housing of the mill 96 is stationary, while the balls 98 are tumbled by a rotary agitator 100.

An outlet 102 leads from the mill 96 through either one or a plurality of screens 104, which are of any desired mesh according to the type of product being processed, and into a valve 106 in a line 108. The valve 106 may be set manually or electrically to selectively direct the flow either into the inlet 110 at the upper end of a storage tank 112 or into a web tank or drums indicated at 114. The material in storage tank 112 may be pumped through a manually or electrically set valve 116 positioned in an outlet 118 to a truck 120 or other storage or delivery means by means of a pump 122.

The entire system is operated in timed synchronism by a timed electrical system. In this respect, the scale 22 is electrically connected through a switch 124 to a timer mechanism 126. The timer 126 may be of any standard construction, as for example, a motor-driven cam acting on the various solenoid switches and solenoid-operated valves. When a predetermined weight is reached in the bin 18, it trips the switch 124 which starts the action of the timer motor. The timer then closes the solenoid valve 16 on the silo 12. In timed sequence, the conveyor motor 128 is actuated by the timer action in closing switch 130, the solenoid valve 49 is opened, the motor 132, connected to the agitator 44, is actuated by the closing of the switch 134, the pumps 82 and 92 are actuated in sequence by the closing of respective switches 136 and 138, followed by actuation of the motor 140, connected to the agitator 100, through closing of switch 142. The pumps 62, 64, and 66 are meanwhile simultaneously actuated through a bank of switches 144, 146, and 148 to replenish the tank 48, and the agitator 50 is then actuated by motor 150 when the switch 152 is closed.

Alternatively, the valve 16 may be an automatically operated rotary valve which is constantly rotated by a motor, in the standard manner, instead of a solenoid valve. However, the remainder of the system would operate in the same manner as described.

If the product is to be delivered to the tank 114, the valve 106 is previously set in the desired position, but if the delivery is to be to the vehicle 120, the valve 106 is alternatively preset for this passage. In such case, the pump 122 may be actuated by the closing of switch 154, connected to the timer circuit, regardless of the position of valve 106, or the valve 106 may be electrically connected through a switch (not shown) to the pump 122 so that only when the selector valve 106 is in a position to direct the flow through the pump 122 will the pump be in closed circuit with the timer system.

It is to be understood that the various switches are all normally open and are closed only intermittently and in predetermined sequence by the timer. On the other hand, the solenoid valves are normally closed and are only opened intermittently.

The term "solenoid valve" also includes ball valves with a remote pneumatic operator, actuated by a solenoid valve in the air line of the operator, since such valve mechanisms are often used for greater effectiveness in handling the rather heavy inks.

At a predetermined portion of the timer cycle, after the weigh bin 18 has been emptied, the valve 16 is again opened and the cycle begins to repeat. This provides for a continuous operation whereby, while the finished product is passing out of one end of the system, different steps of the process are taking place in the various intermediate stages.

Although the premixing tank 48 is preferably used, in the manner described, it is also within the scope of the invention to eliminate this tank and to pass the contents of the tanks 74, 76, and 78 directly into the mixing tank 48.

Although this process has been described in conjunction with the manufacture of printing inks, it is to be understood that it can equally as well be used for any type of product of the same general nature.

What I claim is:

1. A system for manufacturing printing inks and the like, said system comprising a source of granular solid material and a source of liquid material, weighing means for said solid material and a solids passage means for passing said solid material from the source thereof to said weighing means, a solids control means operatively connected to said solids passage, said weighing means being operatively connected to a timer means, a mixing tank, conveying means for conveying said solid material from said weighing means to said mixing tank, fluid passage means operatively connecting said source of liquid material to said mixing tank, fluid control means operatively connected to said fluid passage means, a first mixture passage means connecting said mixing tank with a holding tank, a first mixture passage control means operatively connected to said first mixture passage means, a second mixture passage means connecting said holding tank to a grinding mill, a second mixture passage control means operatively connected to said second mixture passage means, a storage tank connected to said mill by a finished product passage means, a filter assembly interposed in said finished product passage means, and said timer means being in electrical circuit with said conveyor and with all said control means to progressively actuate said conveyor and said control means when said timer means is activated by said weighing means.

2. The system of claim 1 wherein a coolant tank is interposed in said fluid passage means, said fluid-mixing tank having a control means water circuit with said timer means.

3. The system of claim 1 wherein said mixing tank is provided with cooling means.

4. The system of claim 1 wherein said mill comprises a stationary housing, balls adapted to be tumbled in said housing, and an agitating means in said housing for tumbling said balls.